US010104838B1

(12) United States Patent
Ricketts et al.

(10) Patent No.: US 10,104,838 B1
(45) Date of Patent: Oct. 23, 2018

(54) AGRICULTURAL VEHICLE WITH DUAL PURPOSE CONVEYOR

(71) Applicant: CNH Industrial America LLC, New Holland, PA (US)

(72) Inventors: Jonathan E. Ricketts, Coal Valley, IL (US); Robert A. Matousek, Valley Center, KS (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/474,520

(22) Filed: Mar. 30, 2017

(51) Int. Cl.
| | |
|---|---|
| *A01D 17/02* | (2006.01) |
| *A01F 12/46* | (2006.01) |
| *A01D 61/00* | (2006.01) |
| *A01F 12/44* | (2006.01) |
| *A01F 12/60* | (2006.01) |
| *A01D 90/10* | (2006.01) |
| *A01D 41/06* | (2006.01) |
| *A01F 7/06* | (2006.01) |

(52) U.S. Cl.
CPC .......... *A01D 61/008* (2013.01); *A01D 41/06* (2013.01); *A01D 90/10* (2013.01); *A01F 7/06* (2013.01); *A01F 12/446* (2013.01); *A01F 12/46* (2013.01); *A01F 12/60* (2013.01)

(58) Field of Classification Search
CPC ............ A01D 41/1217; A01D 41/1208; A01D 90/10; A01D 61/008; A01F 12/46; A01F 12/60; B60P 1/42; B60P 1/40; B60P 1/36; B60P 1/56
USPC .......... 460/114, 23, 119; 414/502, 390, 519, 414/813; 701/50
See application file for complete search history.

(56) References Cited

U.S. PATENT DOCUMENTS

| | | | |
|---|---|---|---|
| 442,159 A | 12/1890 | Wilde | |
| 1,615,334 A | 1/1927 | MacGregor | |
| 3,339,758 A | 9/1967 | Hubert et al. | |
| 3,580,257 A * | 5/1971 | Teague | A01D 41/1208 460/1 |
| 3,997,089 A * | 12/1976 | Clarke | B60P 1/56 105/280 |

(Continued)

FOREIGN PATENT DOCUMENTS

| | | |
|---|---|---|
| DE | 1 216 602 | 5/1966 |
| GB | 1172472 | 12/1969 |

(Continued)

OTHER PUBLICATIONS

International Search Report and Written Opinion, PCT/US2018/025180, dated Jun. 21, 2018 (11 pages).

*Primary Examiner* — Arpad Fabian-Kovacs
(74) *Attorney, Agent, or Firm* — Peter K. Zacharias

(57) ABSTRACT

An agricultural vehicle includes: a chassis; at least one cleaning sieve carried by the chassis; a grain tank carried by the chassis; an unloader carried by the chassis and configured to unload crop material; and a crop material conveyor carried by the chassis and including a housing having a sieve inlet under the at least one cleaning sieve, a tank outlet coupled to the grain tank, an unloader outlet coupled to the unloader, and an endless conveyor within the housing, the crop material conveyor being configured to switch between a tank feed mode where crop material is conveyed by the endless conveyor out the tank outlet and an unload mode where crop material is conveyed by the endless conveyor out the unloader outlet.

20 Claims, 6 Drawing Sheets

(56) References Cited

U.S. PATENT DOCUMENTS

| | | | | |
|---|---|---|---|---|
| 4,800,902 | A * | 1/1989 | Maust | A01D 41/1208 460/114 |
| 5,453,050 | A * | 9/1995 | Underwood | A01D 41/1208 460/114 |
| 5,496,215 | A | 3/1996 | Underwood et al. | |
| 5,509,854 | A | 4/1996 | Underwood | |
| 6,074,298 | A * | 6/2000 | Majkrzak | A01D 41/1208 460/119 |
| 7,040,980 | B1 * | 5/2006 | Kestel | A01D 41/1217 414/345 |
| 7,833,091 | B2 | 11/2010 | Holtmann et al. | |
| 7,862,286 | B2 | 1/2011 | Mackin et al. | |
| 9,089,090 | B2 * | 7/2015 | Claes | A01D 41/1226 |
| 9,295,197 | B1 * | 3/2016 | Veikle | A01D 61/04 |
| 9,826,681 | B2 * | 11/2017 | Claes | A01D 41/00 |
| 9,901,030 | B2 * | 2/2018 | Matousek | A01D 41/1217 |
| 2003/0175103 | A1 * | 9/2003 | Hunt | A01D 41/1208 414/526 |
| 2005/0031414 | A1 | 2/2005 | Boulanger et al. | |
| 2010/0016045 | A1 * | 1/2010 | Coers | A01D 41/1217 460/114 |
| 2010/0287899 | A1 * | 11/2010 | MacKin | A01D 41/127 56/10.2 R |
| 2012/0099948 | A1 * | 4/2012 | Bump | G01G 13/16 414/21 |
| 2012/0282985 | A1 * | 11/2012 | Coers | A01D 41/1217 460/114 |
| 2013/0089398 | A1 * | 4/2013 | Farley | A01D 41/127 414/526 |
| 2014/0090958 | A1 * | 4/2014 | Mulder | B65G 33/32 198/586 |
| 2014/0135083 | A1 * | 5/2014 | Ricketts | A01D 41/1208 460/114 |
| 2014/0274233 | A1 * | 9/2014 | Michels | A01F 12/60 460/59 |
| 2014/0277963 | A1 * | 9/2014 | Van Mill | A01D 41/127 701/50 |
| 2016/0255776 | A1 | 9/2016 | Missotten et al. | |
| 2016/0362036 | A1 * | 12/2016 | Grodecki | A01D 90/10 |

FOREIGN PATENT DOCUMENTS

| | | | | |
|---|---|---|---|---|
| GB | | 1534496 | 12/1978 | |
| JP | | 07039240 A * | 2/1995 | A01F 12/46 |
| JP | | 2004201650 A * | 7/2004 | A01F 12/46 |
| JP | | 2011024433 A * | 2/2011 | A01F 12/60 |
| JP | | 2016220708 A * | 12/2016 | A01F 12/60 |
| WO | WO-2010038608 A1 * | | 4/2010 | A01D 41/1217 |
| WO | | 2015052563 A1 | 4/2015 | |

\* cited by examiner

AGRICULTURAL VEHICLE WITH DUAL PURPOSE CONVEYOR

FIELD OF THE INVENTION

The present invention relates to agricultural vehicles, and, more particularly, to agricultural harvesters with crop material conveyors.

BACKGROUND OF THE INVENTION

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

As combine harvesters have become larger and run at higher speeds to increase the output rate of collected and cleaned crop material, the potential forces that can be exerted on the crop material have also increased. Such increase in forces on the crop material can reduce the effective yield of the combine harvester due to crop material damage. Efforts to decrease crop damage have included lowering the operating speed of the components of the combine harvester, which negatively affects the output rate of the harvester.

What is needed in the art is an agricultural vehicle which can reduce crop material damage during harvesting without a significant detriment to the output rate.

SUMMARY OF THE INVENTION

In accordance with an aspect of the present invention, there is provided an agricultural vehicle which includes a conveyor assembly having an endless conveyor which conveys crop material to both a grain tank and an unloader of the agricultural vehicle.

In accordance with another aspect of the present invention, there is provided an agricultural vehicle including: a chassis; at least one cleaning sieve carried by the chassis; a grain tank carried by the chassis; an unloader carried by the chassis and configured to unload crop material; and a crop material conveyor carried by the chassis and including a housing having a sieve inlet under the at least one cleaning sieve, a tank outlet coupled to the grain tank, an unloader outlet coupled to the unloader, and an endless conveyor within the housing, the crop material conveyor being configured to switch between a tank feed mode where crop material is conveyed by the endless conveyor out the tank outlet and an unload mode where crop material is conveyed by the endless conveyor out the unloader outlet.

In accordance with yet another aspect of the present invention, there is provided a method of operating an agricultural vehicle including a chassis, at least one cleaning sieve carried by the chassis, a grain tank carried by the chassis, an unloader carried by the chassis, and a crop material conveyor configured to supply crop material to both the grain tank and the unloader with a single endless conveyor, the method including: supplying crop material from the at least one cleaning sieve to a sieve inlet of the crop material conveyor; conveying crop material out of a tank outlet to the grain tank with the endless conveyor when the crop material conveyor is in a tank feed mode; and switching the crop material conveyor from the tank feed mode to an unload mode so that the endless conveyor conveys crop material out of an unloader outlet to the unloader.

An advantage of the agricultural vehicle and method described herein is that the crop material conveyor can reduce the amount of handling experienced by crop material as it is being unloaded from the vehicle, reducing the potential for damage to the material.

Another advantage of the agricultural vehicle and method described herein is that the crop material conveyor can reduce the number of conveying components within the grain tank.

Still another advantage of the agricultural vehicle and method described herein is that the crop material conveyor can be formed with a housing having a variety of different shapes for use in different applications.

BRIEF DESCRIPTION OF THE DRAWINGS

The above-mentioned and other features and advantages of this invention, and the manner of attaining them, will become more apparent and the invention will be better understood by reference to the following description of exemplary embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
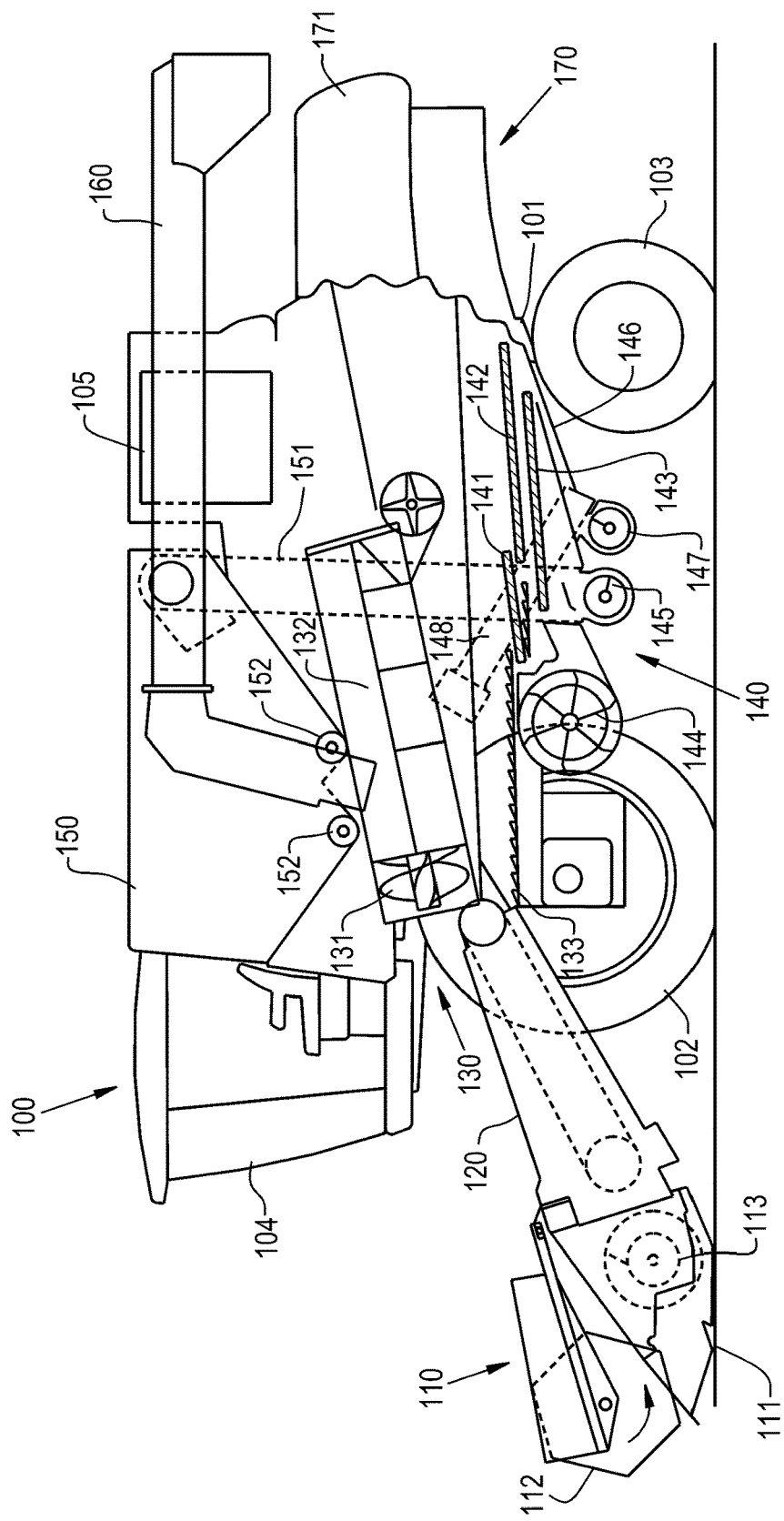
FIG. 1 is a side view of a prior art agricultural vehicle incorporating a traditional crop material elevator, grain tank, and unloader.

Referring now to the drawings, and more particularly to FIG. 1, there is shown a prior art embodiment of an agricultural harvester 100 in the form of a combine which generally includes a chassis 101, ground engaging wheels 102 and 103, header 110, feeder housing 120, operator cab 104, threshing and separating system 130, cleaning system 140, grain tank 150, and unloading conveyance 160. Front wheels 102 are larger flotation type wheels, and rear wheels 103 are smaller steerable wheels. Motive force is selectively applied to front wheels 102 through a power plant in the form of a diesel engine 105 and a transmission (not shown). Although combine 100 is shown as including wheels, is also to be understood that combine 100 may include tracks, such as full tracks or half tracks.

Header 110 is mounted to the front of combine 100 and includes a cutter bar 111 for severing crops from a field during forward motion of combine 100. A rotatable reel 112 feeds the crop into header 110, and a double auger 113 feeds the severed crop laterally inwardly from each side toward feeder housing 120. Feeder housing 120 conveys the cut crop to threshing and separating system 130, and is selectively vertically movable using appropriate actuators, such as hydraulic cylinders (not shown).

Threshing and separating system 130 is of the axial-flow type, and generally includes a threshing rotor 131 at least partially enclosed by a rotor cage (shown in FIG. 2) and rotatable within a corresponding perforated concave 132. The cut crops are threshed and separated by the rotation of rotor 131 within concave 132, and larger elements, such as stalks, leaves and the like are discharged from the rear of combine 100. Smaller elements of crop material including grain and non-grain crop material, including particles lighter than grain, such as chaff, dust and straw, are discharged through perforations of concave 132. Threshing and separating system 130 can also be a different type of system, such as a system with a transverse rotor rather than an axial rotor, etc.

Grain which has been separated by the threshing and separating assembly 130 falls onto a grain pan 133 and is conveyed toward cleaning system 140. Cleaning system 140 may include an optional pre-cleaning sieve 141, an upper sieve 142 (also known as a chaffer sieve or sieve assembly), a lower sieve 143 (also known as a cleaning sieve), and a cleaning fan 144. Grain on sieves 141, 142 and 143 is subjected to a cleaning action by fan 144 which provides an air flow through the sieves to remove chaff and other impurities such as dust from the grain by making this material airborne for discharge from a straw hood 171 of a residue handling system 170 of combine 100. Grain pan 133 and pre-cleaning sieve 141 oscillate in a fore-to-aft manner to transport the grain and finer non-grain crop material to the upper surface of upper sieve 142. Upper sieve 142 and lower sieve 143 are vertically arranged relative to each other, and likewise oscillate in a fore-to-aft manner to spread the grain across sieves 142, 143, while permitting the passage of cleaned grain by gravity through the openings of sieves 142, 143.

Clean grain falls to a clean grain auger 145 positioned crosswise below and toward the front of lower sieve 143. Clean grain auger 145 receives clean grain from each sieve 142, 143 and from a bottom pan 146 of cleaning system 140. Clean grain auger 145 conveys the clean grain laterally to a generally vertically arranged grain elevator 151 for transport to grain tank 150. Tailings from cleaning system 140 fall to a tailings auger trough 147. The tailings are transported via tailings auger 147 and return auger 148 to the upstream end of cleaning system 140 for repeated cleaning action. A pair of grain tank augers 152 at the bottom of grain tank 150 convey the clean grain laterally within grain tank 150 to unloading auger 160 for discharge from combine 100.

As can be appreciated from the foregoing description and FIG. 1, the agricultural vehicle 100 has a significant number of components handling the cleaned crop material between the crop material exiting the cleaning system 140 and exiting the unloading auger 160. These components, when run at high speeds, each have the potential to damage the crop material, especially at inlets and outlets of the components where the forces can be greatest.

Figure 2:
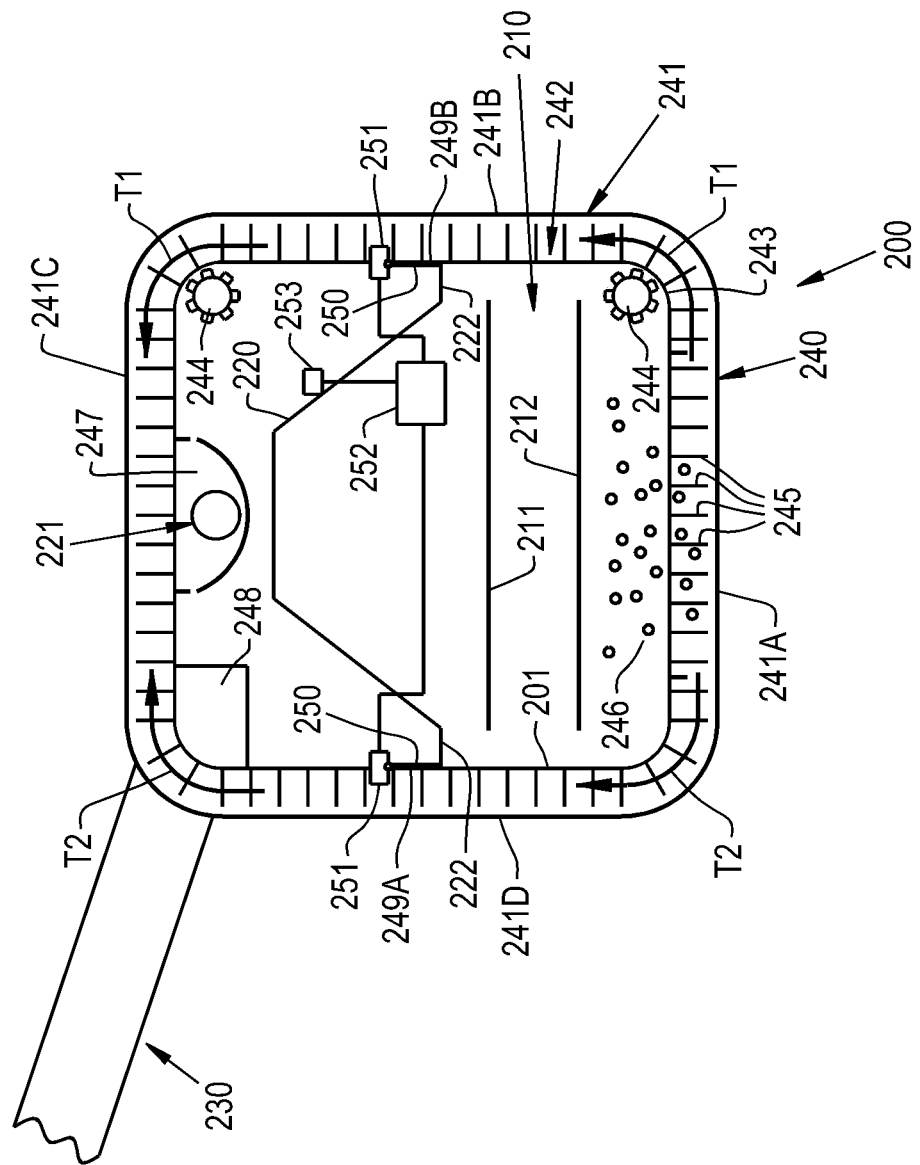
FIG. 2 is a cross-sectional view of an exemplary embodiment of an agricultural vehicle formed in accordance with the present invention.

Referring now to FIG. 2, a cross-sectional view through an exemplary embodiment of an agricultural vehicle 200 formed in accordance with the present invention is shown which includes a chassis 201, a cleaning system 210 having a plurality of cleaning sieves 211, 212 carried by the chassis 201, a grain tank 220 carried by the chassis 201, an unloader 230 carried by the chassis 201, and a crop material conveyor 240 carried by the chassis 201. It should be appreciated that the cleaning system 210 can be configured similarly to the previously described cleaning system 140 or as any other type of system which is suitable to clean collected crop material. Similarly, the grain tank 220 can be formed to have a variety of different shapes, as is known, with varying capacities. The grain tank 220 may have, for example, a tank capacity of several bushels or several hundred bushels, depending on the size and desired carrying capacity of the agricultural vehicle 200. Similarly, the unloader 230 can be formed in a variety of configurations suitable to unload crop material from the agricultural vehicle 200 to, for example, a trailer vehicle (not shown) traveling alongside the agricultural vehicle 200 during harvesting.

As can be seen, the crop material conveyor 240 includes a housing 241 which is shown with a plurality of linear travel regions 241A, 241B, 241C, and 241D to define a substantially quadrilateral shape through which an endless conveyor 242 travels within the housing 241. As used herein, the travel regions 241A, 241B, 241C, and 241D are "linear" in the sense that the sections of the endless conveyor 242 in these regions 241A, 241B, 241C, and 241D will tend to travel in a generally linear, i.e., straight, fashion as the agricultural vehicle 200 operates. As shown, the linear travel regions 241A and 241C can be generally horizontal travel regions where the endless conveyor 242 travels in a generally horizontal direction, while the linear travel regions 241B and 241D can be generally vertical travel regions where the endless conveyor 242 travels in a generally vertical direction. The significance of the linear travel regions 241A, 241B, 241C, and 241D being generally vertical or horizontal will be described further herein. Further, the horizontal linear travel region 241C can be above a top of the grain tank 220, as shown, while the vertical linear travel regions 241B and 241D can be on the lateral ends of the vehicle 200.

The endless conveyor 242 can be formed, for example, to include a conveyor loop 243 driven by a plurality of rotating sprockets 244 and carrying a plurality of paddles 245 which will convey crop material on the paddles 245 as the conveyor loop 243 is driven by the sprockets 244. It should thus be appreciated that the endless conveyor 242 is "endless" in the sense that so long as the endless conveyor 242 is being driven, by sprockets 244 or otherwise, the endless conveyor 242 will travel along a defined travel loop through the housing 241. It should be further appreciated that the exemplary endless conveyor 242 shown herein is only one of many different suitable endless conveyor configurations that can be used and are known, such as conveyor belts, with further discussion of additional endless conveyor configurations being omitted for brevity.

As can be seen, the housing 241 includes a sieve inlet 246 which is below both a top cleaning sieve 211 and a bottom cleaning sieve 212 of the cleaning system 210. Crop material cleaned by the cleaning system 210, therefore, can enter the crop material conveyor 240 through the sieve inlet 246 directly, rather than being conveyed by an auger to the crop material conveyor 240. Once inside the housing 241, the crop material can be conveyed by the endless conveyor 242 throughout the housing 241 along the previously described travel loop of the endless conveyor 242. To supply crop material to both the grain tank 220 and the unloader 230 using the single crop material conveyor 240, the housing 241 includes a tank outlet 247 coupled to the grain tank 220 and an unloader outlet 248 coupled to the unloader 230. As used herein, the outlets 247, 248 of the housing 241 are "coupled" to the grain tank 220 and unloader 230, respectively, in the sense that crop material conveyed by the endless conveyor 242 to the outlets 247, 248 will be directed toward and into the respectively coupled grain tank 220 or unloader 230 due to gravity, the momentum of the crop material from being carried by the endless conveyor 242, and/or with the assistance of an additional component, such as the bubble-up auger 221 shown adjacent to the tank outlet 247. It should thus be appreciated that during operation of the agricultural vehicle 200, crop material conveyed to the outlets 247 and 248 by the endless conveyor 242 will ultimately reach the grain tank 220 or unloader 230, respectively.

As the crop material conveyor 240 operates and it is desired to fill the grain tank 220 with crop material, the endless conveyor 242 can travel in a first direction T1, shown as counter-clockwise, so that crop material which enters the housing 241 through the sieve inlet 246 will be conveyed horizontally through the linear travel region 241A then round a corner of the housing 241 and vertically travel through the linear travel region 241B. Near a top of the linear travel region 241B, the crop material carried by the endless conveyor 242 rounds another corner and travels partially through the horizontal linear travel region 241C before dropping into the tank outlet 247 and (optional) bubble-up auger 221 to enter the grain tank 220. After the paddles 245 pass the tank outlet 247 while traveling in the first direction T1, the paddles 245 should, generally, not be conveying a significant amount of crop material due to the crop material falling off the paddles 245 and into the tank outlet 247. In this respect, the crop material conveyor 240 is in a tank feed mode when the endless conveyor 242 travels in the first direction T1, since crop material conveyed by the endless conveyor 242 will be conveyed out the tank outlet 247, rather than the unloader outlet 248, due to the tank outlet 247 being upstream of the unloader outlet 248 in the first direction T1.

As the crop material conveyor 240 operates and it is desired to unload crop material from the agricultural vehicle 200, the endless conveyor 242 can travel in a second direction T2, shown as clockwise, which is opposite to the first direction T1 so the crop material entering the housing 241 through the sieve inlet 246 travels through the linear travel region 241A and rounds a corner to travel vertically up linear travel region 241D. Once at the top of the linear travel region 241D, the crop material conveyed by the endless conveyor 242 can round a corner and be conveyed out the unloader outlet 248 to the unloader 230 for unloading from the agricultural vehicle 200. After the paddles 245 pass the unloader outlet 248 traveling in the second direction T2, the paddles 245 should, generally, not be conveying a significant amount of crop material, for similar reasons as when the endless conveyor 242 travels in the first direction T1. In this respect, the crop material conveyor 240 is in an unload mode when the endless conveyor 242 travels in the second direction T2, since crop material conveyed by the endless conveyor 242 will be conveyed out the unloader outlet 248, rather than the tank outlet 247, due to the unloader outlet 248 being upstream of the tank outlet 247 in the second direction T2. It can therefore be seen that when the crop material conveyor 240 operates in the unload mode, crop material entering the housing 241 from the cleaning system 210 may never enter the grain tank 220 due to being fed to the unloader outlet 248 rather than the tank outlet 247. This allows the crop material conveyor 240 to, for example, unload cleaned crop material to another tank, such as a grain tank traveling alongside the agricultural vehicle 200, as the agricultural vehicle 200 harvests crop material in a field without the cleaned crop material ever entering the grain tank 220 of the agricultural vehicle 200, reducing the handling of the cleaned crop material and the potential for damage. Crop material unloaded to the other tank can be directly from the cleaning system 210 of the agricultural vehicle 200, and may optionally include crop material that was stored in the gran tank 220. After the other tank is full, the material conveyor 240 can then be placed back in the tank feed mode to fill the grain tank 220, before being switched to the unload mode to fully unload the grain tank 220 at a later time.

From the foregoing description, it should be appreciated how cleaned crop material from the cleaning system 210 is supplied to the unloader 230 by the crop material conveyor 240 while the crop material conveyor 240 is in the unload mode, but there may be instances where the crop material conveyor 240 first supplies crop material to the grain tank 220 in the tank feed mode before switching to the unload mode to supply crop material to the unloader 230. To unload crop material which is held in the grain tank 220, and still referring to FIG. 2, the housing 241 can have one or more tank inlets 249A, 249B which are coupled to the grain tank 220. As shown in FIG. 2, the tank inlets 249A, 249B are located near a bottom 222 of the grain tank 220, which can be sloped toward the tank inlets 249A, 249B, so crop material in the grain tank 220 can be gravity fed into the tank inlets 249A, 249B from the grain tank 220. As shown, the tank inlets 249A, 249B can be formed in the vertical linear travel regions 241B, 241D of the housing 241.

To prevent crop material fed into the grain tank 220 from being re-circulated into the crop material conveyor 240 during the tank feed mode, the housing 241 can include a tank gate 250 associated with each tank inlet 249A, 249B which is coupled to a tank gate actuator 251. The tank gates 250 can cover (close) the tank inlets 249A, 249B, as shown, while the crop material conveyor 240 is in the tank feed mode, preventing crop material from the grain tank 220 re-circulating through the housing 241. When the crop material conveyor 240 is placed in the unload mode, the tank gate actuators 251 can be selectively activated by, for example, a controller 252 coupled to the tank gate actuators 251 so the tank gates 250 are no longer covering the tank inlets 249A, 249B (open) and crop material from the grain tank 220 can enter the housing 241 through the open tank inlets 249A, 249B and be conveyed to the unloader outlet 248 by the endless conveyor 242. In this sense, the controller 252 is configured to control an open state of the tank gates 250 by selective activation of the tank gate actuators 251. When the tank inlets 249A, 249B are open in the unload mode, therefore, the endless conveyor 242 conveys crop material from both the cleaning system 210 and the grain tank 220 to the unloader 230. It should be appreciated that, when the housing includes more than one tank inlet, all tank inlets 249A, 249B do not need to be open at the same time, i.e., the tank inlets 249A, 249B can be opened and closed independently of one another to control the flow rate of crop material into the housing 241 from the grain tank 220. For example, the controller 252 can be configured to only open the tank inlet 249A and/or close the tank inlet 249B when there is a large influx of crop material through the sieve inlet 246 so that crop material from the grain tank 220 does not enter the housing 241 through the tank inlet 249B, which is upstream of the sieve inlet 246 in the second direction T2, and overwhelm the ability of the endless conveyor 242 to convey crop material from the sieve inlet 246. The controller 252 can also be coupled to a fill sensor 253 placed within the grain tank 220 which senses a fill volume of the grain tank 220 and be configured to determine which tank inlet(s) 249A, 249B to open based on the fill volume of the grain tank 220. Once the operator wishes for the crop material conveyor 240 to once again feed crop material to the grain tank 220, the crop material conveyor 240 can be switched back to the tank feed mode and the controller 252 can activate the tank gate actuators 251 to close all open tank inlets 249A, 249B. The controller 252 can also be coupled to one or more driveshafts (not shown) which rotate the sprockets 244 to control the rotational direction of the sprockets 244 and, therefore, whether the endless conveyor 242 travels in the first direction T1 or the second direction T2. It should therefore be appreciated how the controller 252 can be configured to control whether the crop material conveyor 240 is in the tank feed mode or the unload mode by selective control of the open state of the tank gates 250 and/or by controlling the travel direction T1, T2 of the endless conveyor 242.

Figure 3:
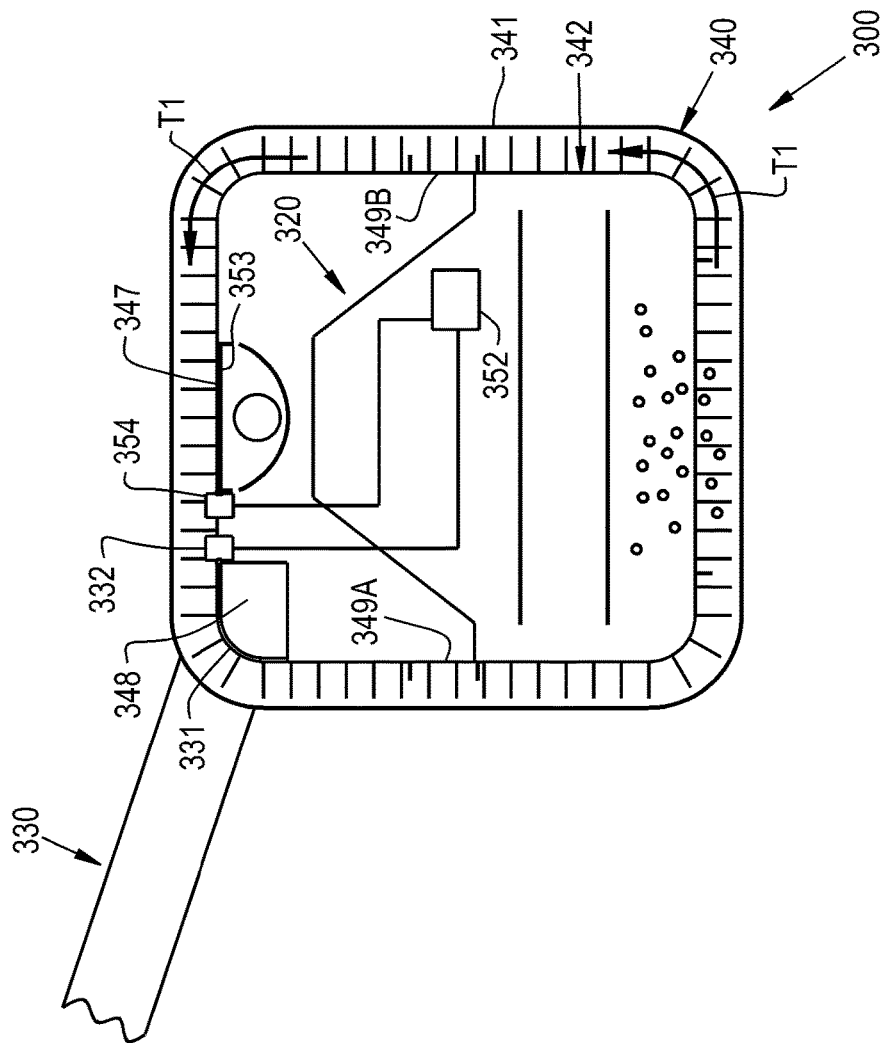
FIG. 3 is a cross-sectional view of another exemplary embodiment of an agricultural vehicle formed in accordance with the present invention.

Referring now to FIG. 3, another exemplary embodiment of an agricultural vehicle 300 formed in accordance with the present invention is shown. As shown, the agricultural vehicle 300 is similar to the agricultural vehicle 200 shown in FIG. 2, with similar elements being assigned similar reference numbers raised by 100. As can be seen, the agricultural vehicle 300 has a single crop material conveyor 340 which feeds both a grain tank 320 and an unloader 330, with the crop material conveyor 340 configured to operate in a tank feed mode where crop material is conveyed to a tank outlet 347 of a housing 341 by an endless conveyor 342 of the crop material conveyor 340 to feed crop material to the grain tank 320 and an unload mode where crop material is conveyed to an unloader outlet 348 of the housing 341 by the endless conveyor 342 to feed crop material to the unloader 330. The housing 341 can also have tank inlets 349A, 349B coupled to the grain tank 320. The tank inlets 349A, 349B of the housing 341 can also be gated similarly to the tank inlets 249A, 249B described previously, i.e., the tank inlets 349A, 349B can be closed in the tank feed mode and open in the unload mode. However, unlike the previously described crop material conveyor 240, the crop material conveyor 340 can switch from the tank feed mode to the unload mode without having to switch the travel direction of the endless conveyor 342, i.e., the endless conveyor 342 travels in a first direction T1 in both the tank feed mode and the unload mode.

To allow for both the grain tank 320 and the unloader 330 to be fed with crop material by the endless conveyor 342 when the endless conveyor 342 travels only in the first direction T1, the crop material conveyor 340 can include a tank outlet gate 353 (shown as being closed) which is associated with the tank outlet 347 and is coupled to a tank outlet actuator 354, which is also coupled to a controller 352. The tank outlet gate 353 can close the tank outlet 347 by covering the tank outlet 347, preventing crop material flow through the tank outlet 347, or the tank outlet 347 can be open when it is partially or fully uncovered by the tank outlet gate 353. In this sense, the controller 352 can control an open state of the tank outlet gate 353 by selectively activating the tank outlet actuator 354 to either open or close the tank outlet gate 353. When the crop material conveyor 340 is in the tank feed mode, the tank outlet gate 353 can be open so that crop material conveyed by the endless conveyor 342 goes into the tank outlet 347 and the grain tank 320. As the tank outlet 347 is upstream of the unloader outlet 348 in the first travel direction T1, a significant amount of crop material conveyed by the endless conveyor 342 should not reach the unloader outlet 348 due to being fed into the tank outlet 347. To prevent any feeding of crop material into the unloader 330 during the tank feed mode, the unloader 330 can have an unloader gate 331 which is closed during the tank feed mode and open during the unload mode, with the unloader gate 331 being opened and closed by selective activation of an unloader gate actuator 332 coupled to the controller 352. When the user wishes to unload crop material from the agricultural vehicle 300, the crop material conveyor 340 can be switched to the unload mode so the tank outlet gate 353 closes the tank outlet 347 and crop material conveyed by the endless conveyor 342 can be conveyed out the unloader outlet 348 and out of the vehicle 300 by the unloader 330. In this respect, the crop material conveyor 340 can be switched between the tank feed mode and the unload mode by controlling the open state of the tank outlet gate 353 and associated tank outlet 347 without the need for changing the travel direction of the endless conveyor 342.

Figure 4:
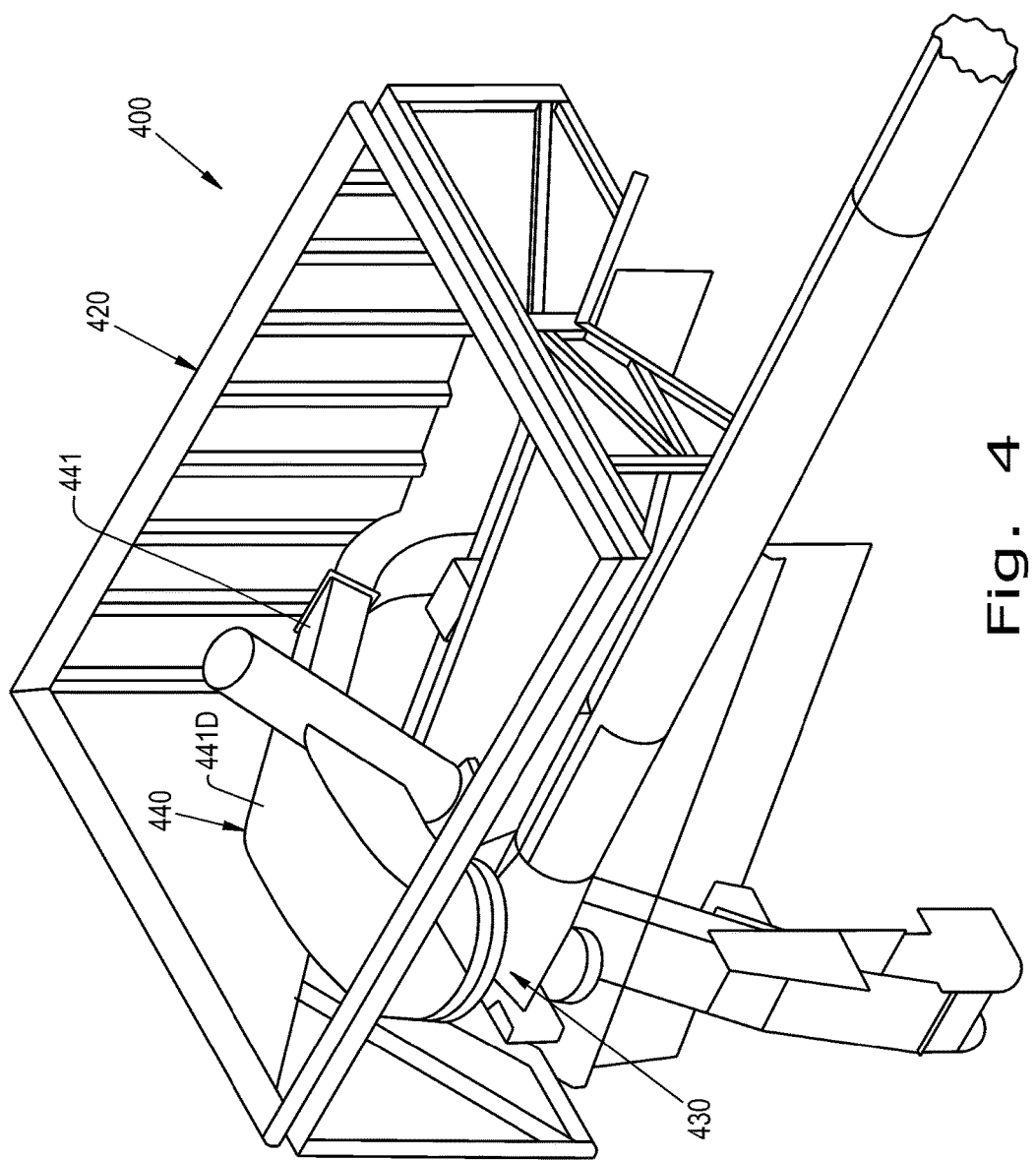
FIG. 4 is a perspective view of yet another exemplary embodiment of an agricultural vehicle formed in accordance with the present invention and incorporating a triangular housing.
Figure 5:
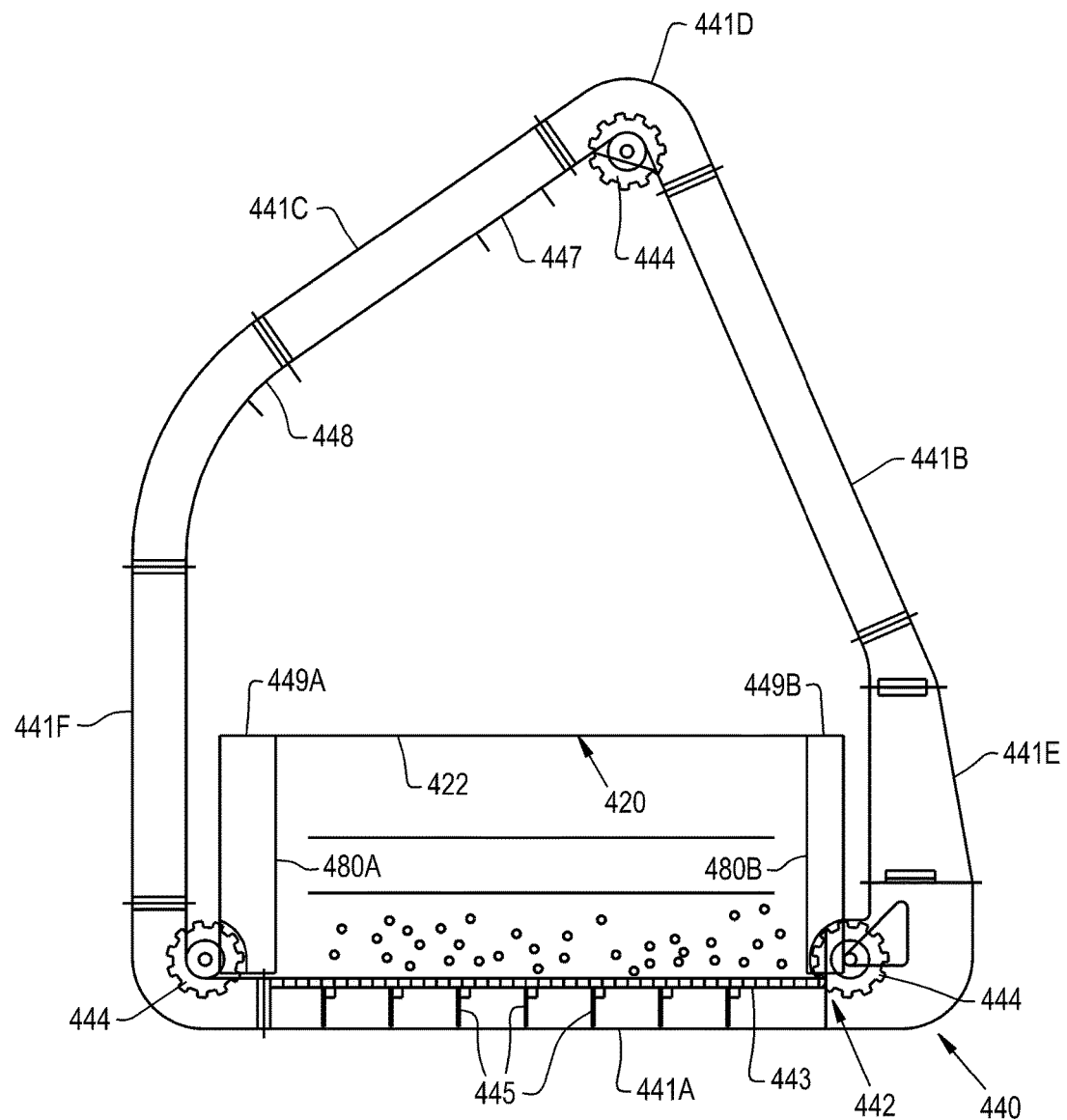
FIG. 5 is a cross-sectional view of the agricultural vehicle shown in FIG. 4, taken along line 5-5.

Referring now to FIGS. 4 and 5, yet another exemplary embodiment of an agricultural vehicle 400 formed according to the present invention is shown. As shown, the agricultural vehicle 400 is similar to the agricultural vehicle 300 shown in FIG. 3, with similar elements being assigned similar reference numbers raised by 100. Unlike the previously described agricultural vehicles 200 and 300, which have crop material conveyors 240, 340 with housings 241, 341 defining generally quadrilateral shapes, the agricultural vehicle 400 shown in FIGS. 4 and 5 has a crop material conveyor 440 with a housing 441 defining a rounded triangular shape, i.e., the housing 441 has three generally linear travel regions 441A, 441B, 441C. In such an embodiment, an apex 441D of the housing 441 may be below a top of a grain tank 420 of the agricultural vehicle 400, unlike the previously described housings 241 and 341 which can have regions above the top of the grain tank. Such a housing shape may be useful in relatively small agricultural vehicles and/or agricultural vehicles with center mounted unloaders which rotate 270° to unload crop material. In all other aspects, however, the crop material conveyor 440 can function similarly to either previously described crop material conveyor 240 or 340, and be configured to switch between a tank feed mode and an unload mode by opening or closing gates of the crop material conveyor 440 and/or switching a travel direction of an endless conveyor of the crop material conveyor 440.

Referring specifically now to FIG. 5, the crop material conveyor 440 is shown in more detail. As can be seen, the crop material conveyor 440 includes an endless conveyor 442 which can have a conveyor loop 443 wrapped around three sprockets 444 at corners of the housing 441, with the sprockets 444 being rotatably driven to cause the conveyor loop 443 to travel through the housing 441 and carry paddles 445 through the housing 441 to convey crop material. As previously described, the housing 441 can have a rounded rectangular shape with linear travel regions 441A, 441B, and 441C as well as vertically extending linear travel regions 441E and 441F which extend generally vertically and connect linear travel regions 441B and 441C, respectively, to linear travel region 441A, which extends generally horizontal. The housing 441 can also include a tank outlet 447 coupled to the grain tank 420 and an unloader outlet 448 coupled to an unloader 430. The tank outlet 447 and/or unloader outlet 448 can be gated, similar to previously described tank and unloader outlets. Further, the housing 441 can have a pair of tank inlets 449A, 449B, which can be gated similar to previously described tank inlets, coupling the grain tank 420 to a bottom 422 of the housing 441 so as to allow material from the grain tank 420 to enter the housing 441 and be conveyed by the endless conveyor 442. Each tank inlet 449A, 449B can have an associated drop chute 480A, 480B to direct material that enters the inlets 449A, 449B to the linear travel region 441A of the housing 441. In all other respects, the crop material conveyor shown in FIGS. 4-5 can be similar to previously described crop material conveyors 240, 340.

Figure 6:
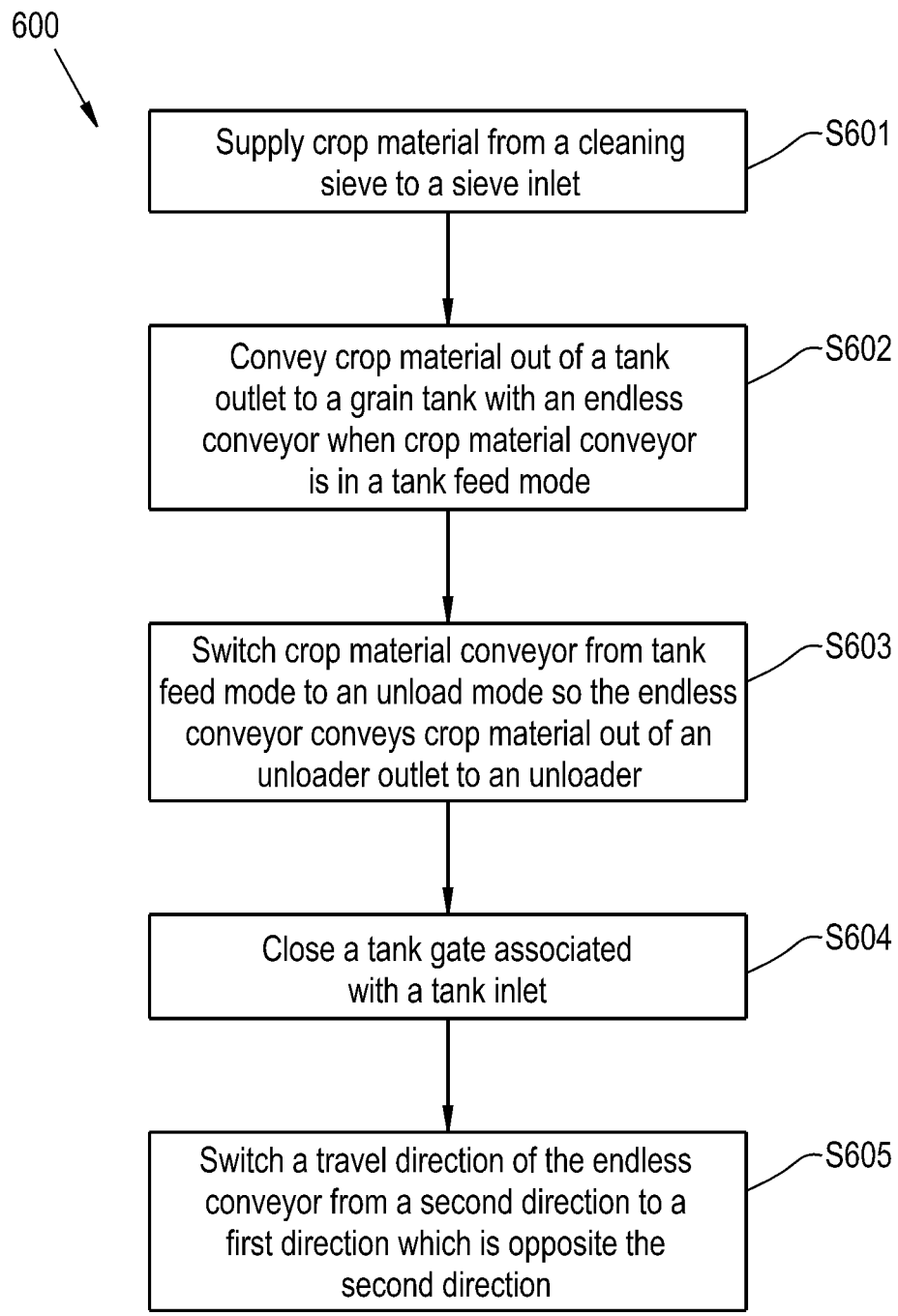
FIG. 6 is a flow chart illustrating an exemplary embodiment of a method according to the present invention.

Referring now to FIG. 6, a flow chart showing an exemplary embodiment of a method 600 performed in accordance with the present invention is shown. The method 600 allows for a crop material conveyor 240, 340, 440 to convey crop material to both a grain tank 220, 320, 420 and an unloader 230, 330, 430 using a single endless conveyor 242, 342, 442 and includes supplying S601 crop material from at least one cleaning sieve 211, 212 to a sieve inlet 246 of the crop material conveyor 240, 340, 440, conveying S602 crop material out of a tank outlet 247, 347, 447 to the grain tank 220, 320, 420 with the endless conveyor 242, 342, 442 when the crop material conveyor 240, 340, 440 is in a tank feed mode, and switching S603 the crop material conveyor 240, 340, 440 from the tank feed mode to an unload mode so that the endless conveyor 242, 342 conveys crop material out of an unloader outlet 248, 348, 448 to the unloader 230, 330, 430. Switching S603 the crop material conveyor 240, 340, 440 from the tank feed mode to the unload mode can include switching a travel direction of the endless conveyor 242, 342 from a first direction T1 to a second direction T2 which is opposite to the first direction. Switching S603 the crop material conveyor 240, 340, 440 from the tank feed mode to the unload mode can also include opening a tank gate 250 associated with a tank inlet 249A, 249B, 349A, 349B, 449A, 449B. The method 600 can also include closing S604 the tank gate 250 and switching S605 the travel direction of the endless conveyor 242, 342, 442 from the second direction T2 to the first direction T1 to switch back to the tank fill mode. Alternatively, switching S603 the crop material conveyor 240, 340, 440 from the tank feed mode to the unload mode can include closing a tank outlet gate 353 associated with the tank outlet 247, 347.

It is to be understood that the steps of the method 600 are performed by a respective controller 252, 352 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controllers 252, 352 described herein, such as the method 600, is implemented in software code or instructions which are tangibly stored on a tangible computer readable medium. Upon loading and executing such software code or instructions by the controller 252, 352, the controller 252, 352 may perform any of the functionality of the controller 252, 352 described herein, including any steps of the method 600 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit, by a controller, or by a controller system.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural vehicle, comprising:
   a chassis;
   at least one cleaning sieve carried by said chassis;
   a grain tank carried by said chassis;
   an unloader carried by said chassis and configured to unload crop material; and
   a crop material conveyor carried by said chassis and including a housing having a sieve inlet under said at least one cleaning sieve, a tank outlet coupled to said grain tank, an unloader outlet coupled to said unloader, and an endless conveyor within said housing, said crop material conveyor being configured to switch between a tank feed mode where crop material is conveyed by said endless conveyor out said tank outlet and an unload mode where crop material is conveyed by said endless conveyor out said unloader outlet.

2. The agricultural vehicle according to claim 1, wherein said housing includes at least one tank inlet coupled to said grain tank.

3. The agricultural vehicle according to claim 2, wherein said housing includes a tank gate associated with said at least one tank inlet and a tank gate actuator coupled to said tank gate, said agricultural vehicle further comprising a controller coupled to said tank gate actuator, said controller being configured to control an open state of said tank gate by selective activation of said tank gate actuator.

4. The agricultural vehicle according to claim 3, wherein said controller is configured to close said tank gate when said crop material conveyor is in said tank feed mode and open said tank gate when said crop material conveyor is in said unload mode.

5. The agricultural vehicle according to claim 3, wherein said controller is configured to close said tank gate when said crop material conveyor is in said unload mode.

6. The agricultural vehicle according to claim 3, wherein said housing includes a tank outlet gate associated with said tank outlet and a tank outlet actuator coupled to said tank outlet gate and said controller, said controller being configured to control an open state of said tank outlet gate by selective activation of said outlet actuator.

7. The agricultural vehicle according to claim 6, wherein said controller is configured to open said tank outlet gate when said crop material conveyor is in said tank feed mode and close said tank outlet gate when said crop material conveyor is in said unload mode.

8. The agricultural vehicle according to claim 1, wherein said endless conveyor is configured to travel in a first direction when said crop material conveyor is in said tank feed mode and a second direction opposite to said first direction when said crop material conveyor is in said unload mode.

9. The agricultural vehicle according to claim 8, wherein said tank outlet is upstream of said unloader outlet in the first direction.

10. The agricultural vehicle according to claim 1, wherein said housing includes a plurality of linear travel regions.

11. The agricultural vehicle according to claim 10, wherein said housing defines a generally quadrilateral shape.

12. A method of operating an agricultural vehicle including a chassis, at least one cleaning sieve carried by said chassis, a grain tank carried by said chassis, an unloader carried by said chassis, and a crop material conveyor configured to supply crop material to both said grain tank and said unloader with a single endless conveyor, said method comprising:
    supplying crop material from said at least one cleaning sieve to a sieve inlet of said crop material conveyor;
    conveying crop material out of a tank outlet to said grain tank with said endless conveyor when said crop material conveyor is in a tank feed mode; and
    switching said crop material conveyor from said tank feed mode to an unload mode so that said endless conveyor conveys crop material out of an unloader outlet to said unloader.

13. The method according to claim 12, wherein said crop material conveyor includes at least one tank inlet coupled to said grain tank and a tank gate associated with said at least one tank inlet.

14. The method according to claim 13, wherein said switching from said tank feed mode to said unload mode comprises switching a travel direction of said endless conveyor from a first direction to a second direction which is opposite to said first direction.

15. The method according to claim 14, wherein said switching from said tank feed mode to said unload mode further comprises opening said tank gate.

16. The method according to claim 15, further comprising closing said tank gate and switching the travel direction of said endless conveyor from the second direction to the first direction.

17. The method according to claim 14, wherein said tank outlet is upstream of said unloader outlet in the first direction.

18. The method according to claim 12, said switching from said tank feed mode to said unload mode comprises closing a tank outlet gate associated with said tank outlet.

19. The method according to claim 12, wherein said crop material conveyor includes a housing having a plurality of linear travel regions, said endless conveyor being housed within said housing.

20. The method according to claim 19, wherein said housing defines a generally quadrilateral shape.

* * * * *